(12) United States Patent
Jeong et al.

(10) Patent No.: US 9,483,688 B2
(45) Date of Patent: Nov. 1, 2016

(54) SYSTEM AND METHOD FOR EVALUATING FACE RECOGNITION PERFORMANCE OF SERVICE ROBOT USING ULTRA HIGH DEFINITION FACIAL VIDEO DATABASE

(71) Applicant: Electronics and Telecommunications Research Institute, Daejeon (KR)

(72) Inventors: Young Sook Jeong, Daejeon (KR); Mi Young Cho, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 46 days.

(21) Appl. No.: 14/540,417

(22) Filed: Nov. 13, 2014

(65) Prior Publication Data
US 2015/0199561 A1 Jul. 16, 2015

(30) Foreign Application Priority Data
Jan. 16, 2014 (KR) .......................... 10-2014-0005546

(51) Int. Cl.
*G06K 9/00* (2006.01)

(52) U.S. Cl.
CPC ................................. *G06K 9/00288* (2013.01)

(58) Field of Classification Search
None
See application file for complete search history.

(56) References Cited

U.S. PATENT DOCUMENTS

| 8,135,220 | B2 | 3/2012 | Kim et al. | |
| 2002/0103574 | A1* | 8/2002 | Funada | G06K 9/00288 700/245 |
| 2004/0208363 | A1* | 10/2004 | Berge | H04N 9/735 382/167 |
| 2009/0201365 | A1* | 8/2009 | Fukuoka | A61B 5/442 348/77 |
| 2010/0286827 | A1* | 11/2010 | Franzius | G06K 9/6232 700/259 |
| 2011/0013845 | A1* | 1/2011 | Tu | G06K 9/00288 382/218 |
| 2013/0343600 | A1* | 12/2013 | Kikkeri | G06K 9/00221 382/103 |

FOREIGN PATENT DOCUMENTS

| KR | 1020060068796 A | 6/2006 |
| KR | 1020130065604 A | 6/2013 |
| KR | 1013131030000 B1 | 9/2013 |

OTHER PUBLICATIONS

Byung Tae Chun et al., Evaluation Method for HRI of Intelligent Robot using Moving Image Database, Nov. 23, 2014, ETRI, Daejeon, Republic of Korea.

* cited by examiner

*Primary Examiner* — Siamak Harandi
*Assistant Examiner* — Mai Tran
(74) *Attorney, Agent, or Firm* — William Park & Associates Ltd.

(57) ABSTRACT

Provided are a system and method for evaluating the face recognition performance of a service robot using an ultra high definition (UHD) facial video database. The system includes a video output unit configured to output a registration-purpose or test-purpose UHD facial video, a robot test controller configured to control transmitting identification (ID) information on a video currently being output to a service robot having a face recognition function when the video currently being output is a registration-purpose video, and control performing evaluation of the face recognition function of the service robot using a recognition result received from the service robot when the video currently being output is a test-purpose video, and a wired/wireless communication unit configured to transmit the ID information and usage information indicating whether the video currently being output is a registration-purpose video or a test-purpose video to the service robot.

13 Claims, 10 Drawing Sheets

TEST-PURPOSE FACIAL VIDEO DB    TEST LEVEL (TL: TEST LEVEL)

FACIAL POSE:    -10'~0'~10'    -20'~20'    -30'~30'    TEST LEVEL 1: POSE (THREE)
                    P1              P2          P3

ANGLE OF
LIGHTING:    0'    -30'    +30' ... +90', -90', BACK LIGHT    TEST LEVEL 2: POSE (THREE)* LIGHT SOURCE (TEN)
             P10   P11     P12

FACIAL
EXPRESSION: SURPRISE, FEAR, DISGUST, ANGER, HAPPINESS, SADNESS    TEST LEVEL 3: POSE (THREE)* LIGHT SOURCE (TEN)*
            P1010    P1110    P1210 ...                                          FACIAL EXPRESSION (SIX)

FACIAL POSE:    -10'~0'~10'    -20'~20'    -30'~30'    TEST LEVEL 4: POSE (THREE)* LIGHT SOURCE (TEN)*
                    P1              P2          P3                  MULTIPLE FACE (THREE)

ANGLE OF
LIGHTING:    0'    -30'    +30' ... +90', -90', BACK LIGHT
             P10   P11     P12

MULTIPLE
FACE:    TWO      THREE    FOUR
         PERSONS  PERSONS  PERSONS
         P1120    P1121    P1122 ...

FIG.7D

SYSTEM AND METHOD FOR EVALUATING FACE RECOGNITION PERFORMANCE OF SERVICE ROBOT USING ULTRA HIGH DEFINITION FACIAL VIDEO DATABASE

CROSS-REFERENCE TO RELATED APPLICATION

This application claims priority to and the benefit of Korean Patent Application No. 10-2014-0005546, filed on Jan. 16, 2014, the disclosure of which is incorporated herein by reference in its entirety.

BACKGROUND

1. Field of the Invention

The present invention relates to technology for evaluating the face recognition performance of a service robot, and more particularly, to a system and method for evaluating the face recognition performance of a service robot using an ultra high definition (UHD) facial video database.

2. Discussion of Related Art

To actively provide individual users with customized service, an intelligent robot should be able to identify and recognize a user first. To this end, as a typical function for human-robot interaction (HRI), a face recognition function of recognizing a user without direct contact with a user is widely used. Due to its excellent performance and convenience, the face recognition technology is most widely used for a robot to identify a user. Face recognition is performed by determining one of previously registered users as being similar to a user present in a screen using image information acquired through a camera installed in a robot.

In Korean Patent Application Publication No. 2006-68796, etc., technology for performing face recognition based on test data provided in the form of a hard disk or a Universal Serial Bus (USB) memory using a face recognition program stored in a memory of a computer and analyzing the performance of a face recognition system based on resultant information is disclosed. However, in such existing technology for analyzing the performance of a face recognition system disclosed in Korean Patent Application Publication No. 2006-68796, etc., operating environment elements, such as the degree of illumination in an environment in which an intelligent robot actually operates, the distance between the intelligent robot and a user who is the target of face recognition, and an angle of the user's face, are not sufficiently taken into consideration, and thus face recognition evaluation results of the system lack reliability.

Other existing methods of evaluating the face recognition performance of a robot include a method using a mannequin, a method using an algorithm, a method using a photograph, and so on. The performance evaluation method using a mannequin has many problems because the coating material of the mannequin is not the same as the skin of a human. The performance evaluation method using an algorithm is a method of evaluating the performance of an algorithm installed in a robot. This method can be regarded as a method of evaluating an algorithm executed on a computer rather than a method of evaluating the overall performance of a robot. The performance evaluation method using a photograph has overcome existing problems, but has a slight problem of manufacturing an installation tool, a difficulty in automatic control interoperation with a computer, and a lack of reproducibility of an actual situation.

Therefore, it is necessary to construct a test environment in which various situations faced by a user and an intelligent robot are created similarly to actual environments, the intelligent robot performs the face recognition function in such environments, and the reliability of the face recognition performance of the intelligent robot can be ensured by analyzing results of the face recognition function.

SUMMARY OF THE INVENTION

The present invention is directed to a system and method capable of evaluating the face recognition performance of a robot using an ultra high definition (UHD) facial video.

According to an aspect of the present invention, there is provided a system for evaluating face recognition performance of a robot using an UHD facial video database, the system including: a video output unit configured to output a registration-purpose or test-purpose UHD facial video; a robot test controller configured to control transmitting identification (ID) information on a video currently being output to a service robot having a face recognition function when the video currently being output is a registration-purpose video, and performing evaluation of the face recognition function of the service robot using a recognition result received from the service robot when the video currently being output is a test-purpose video; and a wired/wireless communication unit configured to transmit the ID information and usage information indicating whether the video currently being output is a registration-purpose video or a test-purpose video to the service robot.

In an exemplary embodiment, the robot test controller may control outputting N registration-purpose videos on the video output unit and transmitting N pieces of ID information on the N registration-purpose videos and the usage information on the N registration-purpose videos to the service robot, and when the usage information indicates registration-purpose videos, the service robot may separately register the N registration-purpose videos according to the N pieces of ID information.

In an exemplary embodiment, the UHD facial video database may be constructed of the registration-purpose video and the test-purpose video, the registration-purpose video may be a facial video captured under one light source in an environment having a plurality of light sources, and the test-purpose video may be a plurality of facial videos separately captured under respective light sources in an environment having the plurality of light sources.

In an exemplary embodiment, the robot test controller may control outputting N×M test videos separately captured under M respective light sources in an environment having the M light sources on the video output unit for N respective registration-purpose videos, and transmitting the usage information on the N×M test-purpose videos to the service robot, and when the usage information indicates test-purpose videos, the service robot may compare the N×M test-purpose videos with the N registration-purpose videos and output recognition results.

According to another aspect of the present invention, there is provided a method of evaluating face recognition performance of a robot using an UHD facial video database, the method including: preparing registration-purpose and test-purpose UHD facial videos; displaying the registration-purpose UHD facial video on an output device; transmitting ID information on the registration-purpose UHD facial video and first usage information indicating whether the video currently being output is a registration-purpose video or a test-purpose video to the service robot; displaying the test-purpose UHD facial video on the output device; transmitting second usage information indicating whether the video currently being output is a registration-purpose video or a test-purpose video to the service robot; and receiving a face recognition result determined by the service robot for the test-purpose UHD facial video displayed on the output device, and evaluating performance of a face recognition function of the service robot using the received face recognition result.

In an exemplary embodiment, the preparing of the registration-purpose and test-purpose UHD facial videos may include constructing a database of the registration-purpose UHD facial video and the test-purpose UHD facial video, the registration-purpose UHD facial video may be a facial video captured under one light source in an environment having a plurality of light sources, and the test-purpose UHD facial video may be a plurality of facial videos separately captured under respective light sources in an environment having the plurality of light sources.

In an exemplary embodiment, the displaying of the test-purpose UHD facial video on the output device may include displaying N×M test videos separately captured under M respective light sources in an environment having the M light sources on the video output unit for N registration-purpose videos.

In an exemplary embodiment, the evaluating of the performance may include outputting a performance index of a ratio of a number of pieces of ID information returned as the face recognition result from the service robot to a number of pieces of the ID information on the registration-purpose UHD facial video registered in the service robot.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will now be described more fully with reference to the accompanying drawings to clarify aspects, features, and advantages of the present invention. The invention may, however, be embodied in many different forms and should not be construed as being limited to the embodiments set forth herein. Rather, these embodiments are provided so that this disclosure will be through and complete, and will fully convey the concept of the invention to those of ordinary skill in the art. The present invention is defined by the appended claims. Meanwhile, the terms used herein are for the purpose of describing particular exemplary embodiments only and are not intended to be limiting. As used herein, the singular forms "a," "an," and "the" are intended to include the plural forms as well, unless the context clearly indicates otherwise. It will be further understood that the terms "comprises" or "comprising," when used in this specification, do not preclude the presence or addition of one or more other components, steps, operations, and/or elements.

Hereinafter, the present invention will be described in detail with reference to the accompanying drawings. Throughout the drawings, like reference numerals denote like elements. In the description of the present invention, if it is determined that a detailed description of a well-known element or function related to the invention may obscure the gist of the invention, the detailed description will be omitted.

Figure 1:
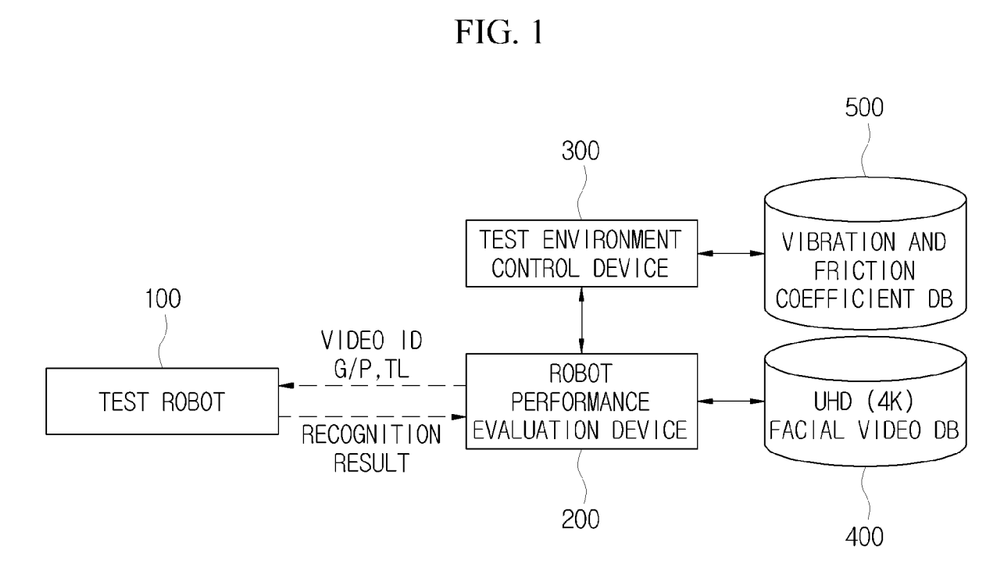
FIG. 1 is a block diagram of a system for evaluating the face recognition performance of a service robot using an ultra high definition (UHD) facial video database according to an exemplary embodiment of the present invention.

FIG. 1 is a block diagram of a system for evaluating the face recognition performance of a service robot using an ultra high definition (UHD) facial video database according to an exemplary embodiment of the present invention.

Referring to FIG. 1, a system for evaluating the face recognition performance of a service robot using a UHD facial video database according to an exemplary embodiment of the present invention includes a robot performance evaluation device 200, a test environment control device 300, a UHD facial video database 400, and a vibration and friction coefficient database 500.

A service robot 100 has a face recognition function, and performs face recognition by capturing a facial video output from the robot performance evaluation device 200. A result of face recognition performed by the service robot 100 is transmitted to the robot performance evaluation device 200 via a network.

The robot performance evaluation device 200 controls output of a facial video, manages evaluation of robot performance, and analyzes a face recognition result. For example, the robot performance evaluation device 200 can include an image output device and a test evaluation device body.

The test evaluation device body selects a facial video to be output on the image output device from among UHD facial videos stored in the UHD facial video database 400, and transmits specifications of the facial video to the service robot 100 via the network.

For example, in the UHD facial video database 400, registration-purpose (gallery) facial videos and test-purpose (probe) facial videos can be separately stored according to usages. Registration-purpose facial videos denote videos registered in the service robot 100 to evaluate face recognition performance. Test-purpose facial videos denote videos that are targets of recognition based on registration-purpose facial videos.

In the UHD facial video database 400, specifications of the registration-purpose facial videos and the test-purpose facial videos are stored together with the registration-purpose facial videos and the test-purpose facial videos. The specifications include identification (ID) information, usage (gallery/probe) information, and test level information of the registration-purpose facial videos and the test-purpose facial videos.

In this way, the test evaluation device body selects a facial video from the UHD facial video database 400 and outputs the selected facial video to the image output device. The test evaluation device body transmits specifications of the output facial video to the service robot 100. The service robot 100 can identify a captured facial video using the received specifications and find the usage and the test level of the facial video.

Also, the test evaluation device body outputs a performance evaluation result of the face recognition function using a face recognition result received from the service robot 100.

Meanwhile, the test evaluation device body can be installed in a laboratory together with the image output device, and may also be installed outside a laboratory. Here, the test evaluation device body can control the image output device by a wired communication method using a pair cable, a coaxial cable, an optical fiber cable, etc. and a wireless communication method, such as ZigBee, binary-code division multiple access (B-CDMA), or wireless fidelity (WiFi).

The test environment control device 300 creates a test environment that is the same as an actual operating environment of the service robot 100.

For example, the test environment control device 300 reproduces vibration occurring upon movement of the service robot 100 as in an actual operating environment, and adjusts the UHD facial video output on the image output device to have a condition the same as or similar to the face of a real person.

Figure 7A:
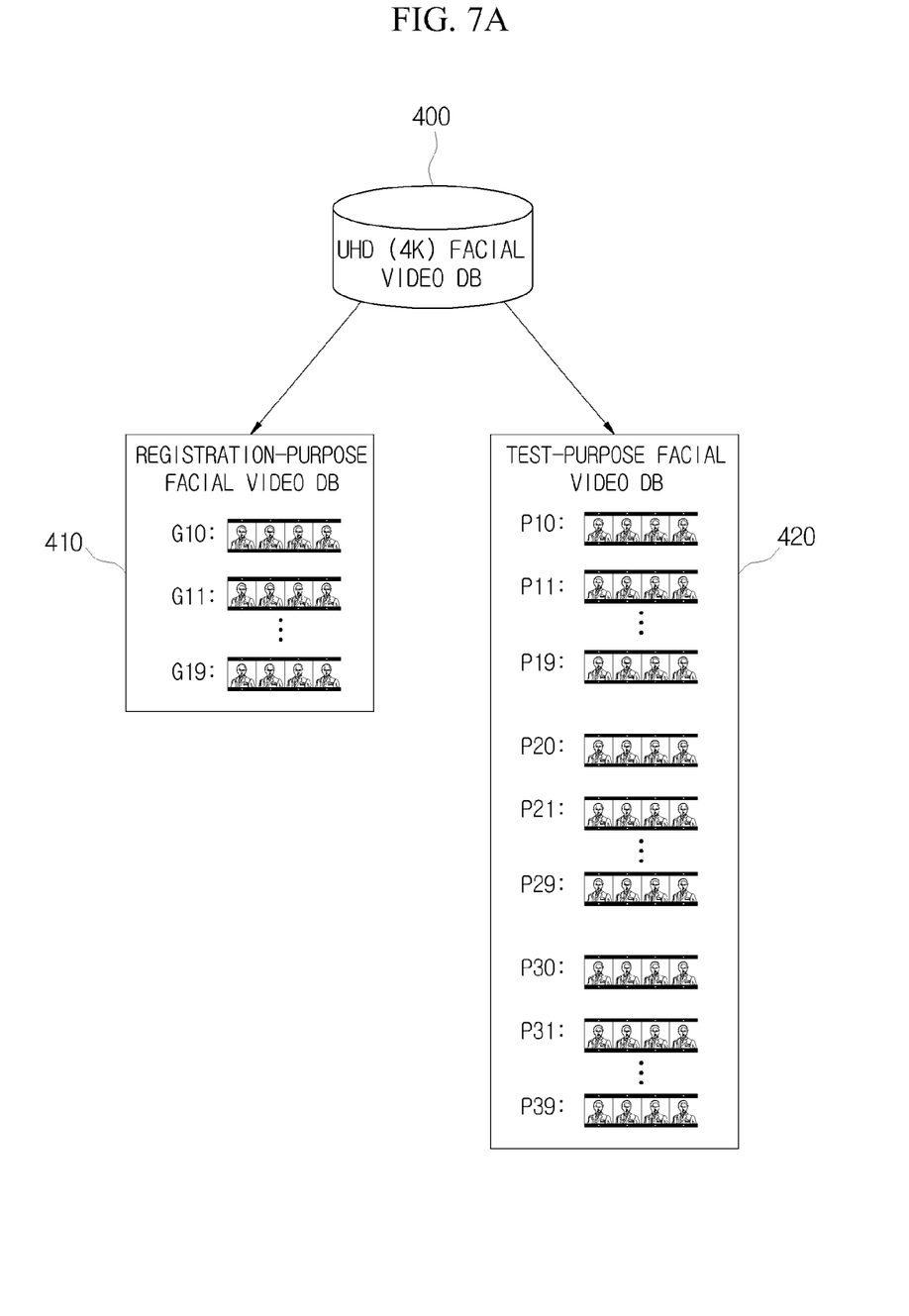
FIG. 7A shows an example of databases separately constructed from registration-purpose facial videos and test-purpose facial videos according to an exemplary embodiment of the present invention.
Figure 7B:
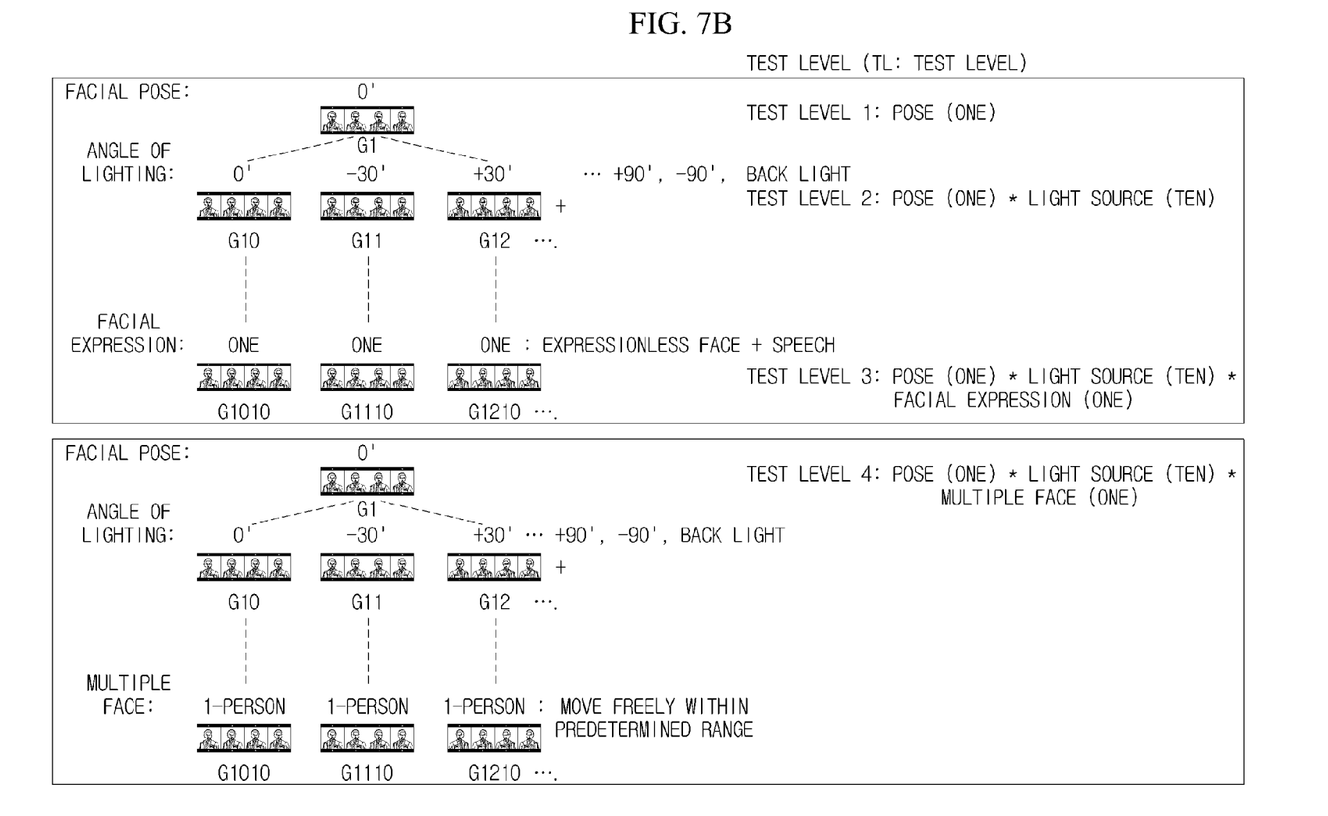
FIG. 7B shows an example of constructing a registration-purpose facial video database according to an exemplary embodiment of the present invention.
Figure 7C:
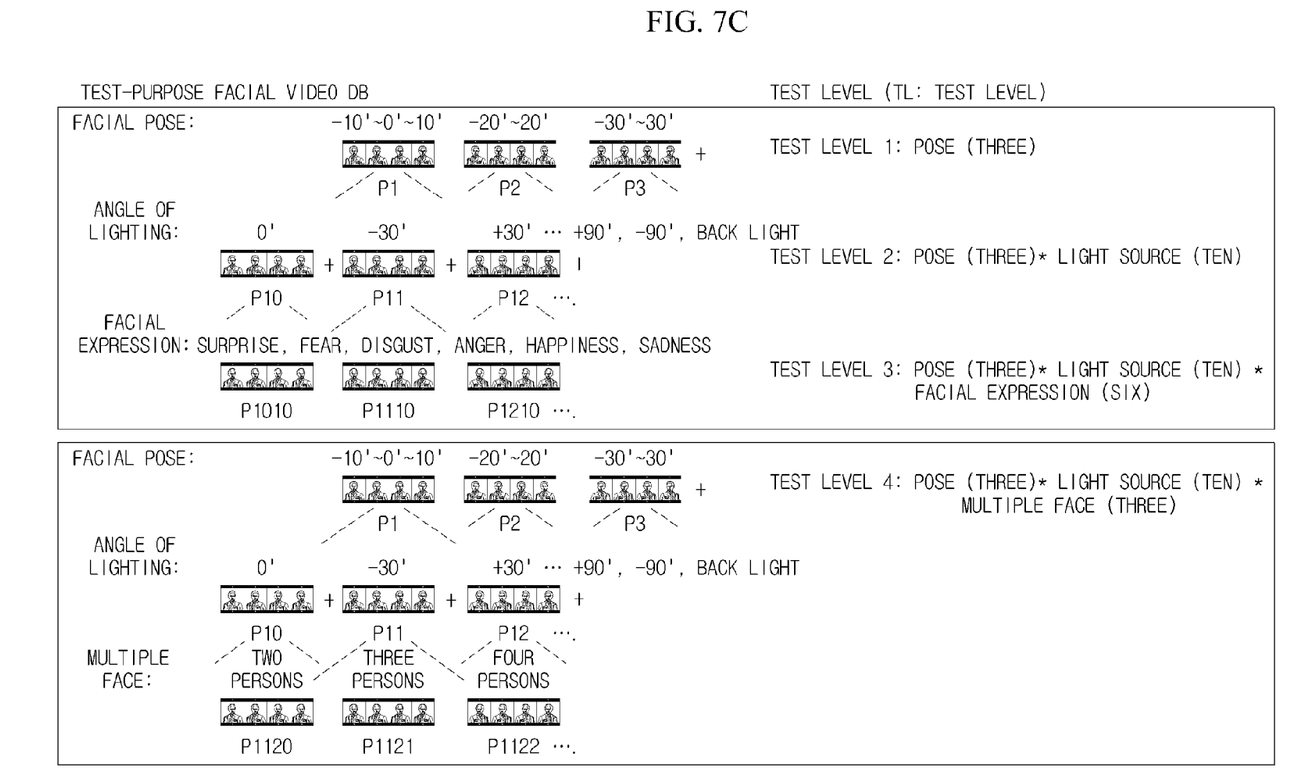
FIG. 7C shows an example of constructing a test-purpose facial video database according to an exemplary embodiment of the present invention.

In the UHD facial video database 400, registration-purpose facial videos and test-purpose facial videos can be separately stored. FIGS. 7A to 7C show an example of a method of constructing a UHD facial video database according to an exemplary embodiment of the present invention and examples of facial video databases constructed according to the method.

FIG. 7A shows an example of databases separately constructed from registration-purpose facial videos and test-purpose facial videos according to an exemplary embodiment of the present invention. For example, a registration-purpose facial video database 410 can be constructed from videos G10, G11, . . . , and G19 of a face in one pose captured under light sources having different angles with respect to the face, and a test-purpose facial video database 420 can be constructed from videos P10, P11, . . . , and P19; P20, P21, . . . , and P29; and P30, P31, . . . , and P39 of a face in three poses captured under light sources having different angles with respect to the face. Here, poses of a face can be classified according to a rotation range of the face. For example, the case of no face movement can be defined as a first face pose, the case of a face movement ranging from −10 degrees to +10 degrees can be defined as a second face pose, and the case of a face movement ranging from −20 degrees to +20 degrees can be defined as a third face pose.

Meanwhile, there are a variety of types and usages of robots, and thus it is necessary to evaluate performance of a robot after selecting an appropriate test level for the type and the usage of the robot. Therefore, each (registration/test-purpose) of the databases 410 and 420 can be constructed from four kinds of facial videos classified according to test levels of a robot.

The registration-purpose facial video database 410 can be constructed as shown in FIG. 7B.

Referring to FIG. 7B, in the registration-purpose facial video database 410, four kinds of registration-purpose facial video databases from Test level 1 to Test level 4 are constructed.

Test level 1 denotes a database of facial videos captured for five seconds under the same light source when there is no facial movement of a person. Test level 2 denotes a database of facial videos captured for five seconds under 10 respective light sources (see FIG. 7D) at Test level 1 (where there is no facial movement). Test level 3 denotes a database of videos of a face additionally including a change in facial expression in comparison with Test level 2. For example, when there is no facial movement but there is movement of lips, a database of Test level 3 is constructed by capturing the face for five seconds under 10 respective light sources. Test level 4 includes a situation in which one person can move freely within a predetermined range in comparison with Test level 2. For example, when there is no facial movement of a person but the person moves freely within the predetermined range, a database of Test level 4 is constructed by capturing the face for five seconds under 10 respective light sources.

Meanwhile, the test-purpose facial video database 420 can be constructed as shown in FIG. 7C.

Referring to FIG. 7C, in the test-purpose facial video database 420 also, four kinds of test-purpose facial video databases from Test level 1 to Test level 4 are constructed.

Test level 1 denotes a database of facial videos of a face in three poses captured for five seconds under the same light source. For example, three kinds of test-purpose facial video databases are constructed by capturing the face while the face moves in a range from −10 degrees to 10 degrees, a range from −20 degrees to 20 degrees, and a range from −30 degrees to 30 degrees.

In Test level 2, lighting is diversified in comparison with Test level 1. For example, a database of 30 kinds of facial videos is constructed by capturing the face in three poses for five seconds under 10 respective light sources.

In Test level 3, a facial expression is diversified in comparison with Test level 2. For example, a database of 180 (=3×6×10) kinds of test-purpose facial videos is constructed by capturing six kinds (surprise, fear, disgust, anger, happiness, and sadness) of facial expressions for five seconds under 10 respective light sources.

Test level 4 is intended for performance evaluation when multiple persons complexly move. In Test level 4, a personnel organization is diversified in comparison with Test level 2. For example, a database of 90 (=3×3×10) kinds of test-purpose facial videos is constructed by capturing three kinds of facial expressions of three personnel organizations (when two, three, and four persons move; at this time, one registered person should be included in the two, three, and four persons) for five seconds under 10 respective light sources.

Figure 7D:
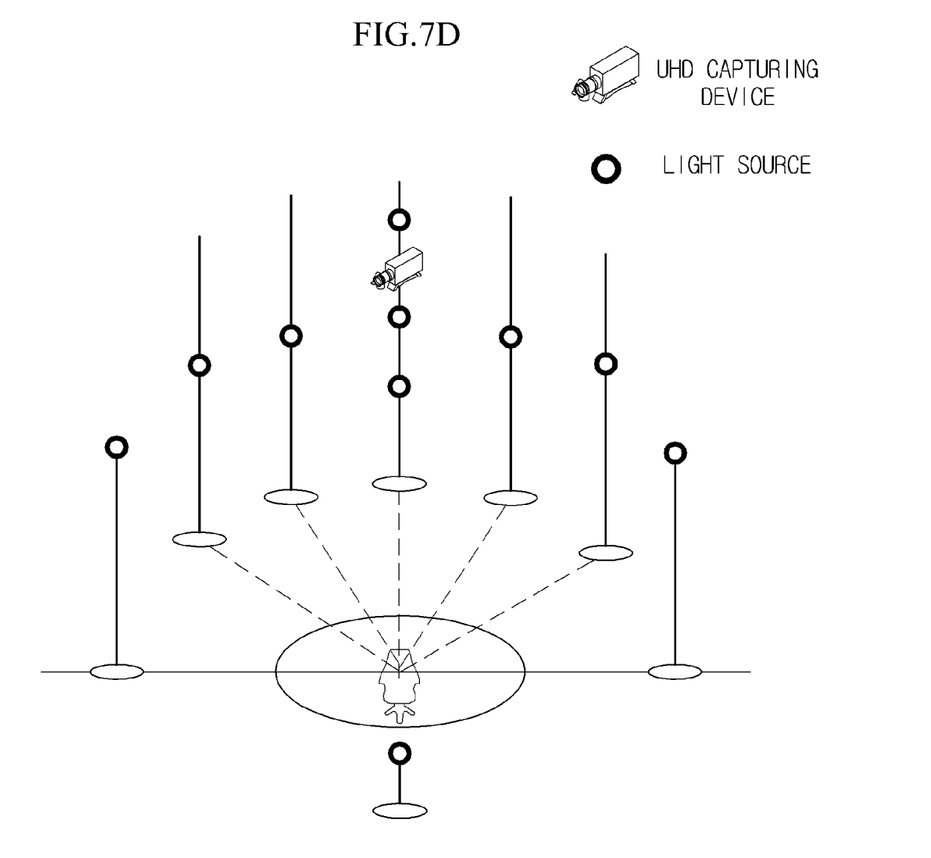
FIG. 7D is a diagram of a lighting environment for constructing a facial video database according to an exemplary embodiment of the present invention.

FIG. 7D is a diagram of a lighting environment for constructing a facial video database according to an exemplary embodiment of the present invention.

Referring to FIG. 7D, a total of 10 light sources are disposed according to angles (two at 30 degrees, two at 60 degrees, two at 90 degrees, two at the middle up and down, one at dead center, and one behind a subject person), and a UHD capturing device for capturing a subject person is installed at the middle.

An internal configuration of a system for evaluating the face recognition performance of a service robot using a UHD facial video database according to an exemplary embodiment of the present invention will be described in detail below with reference to FIGS. 2 to 5.

Figure 2:
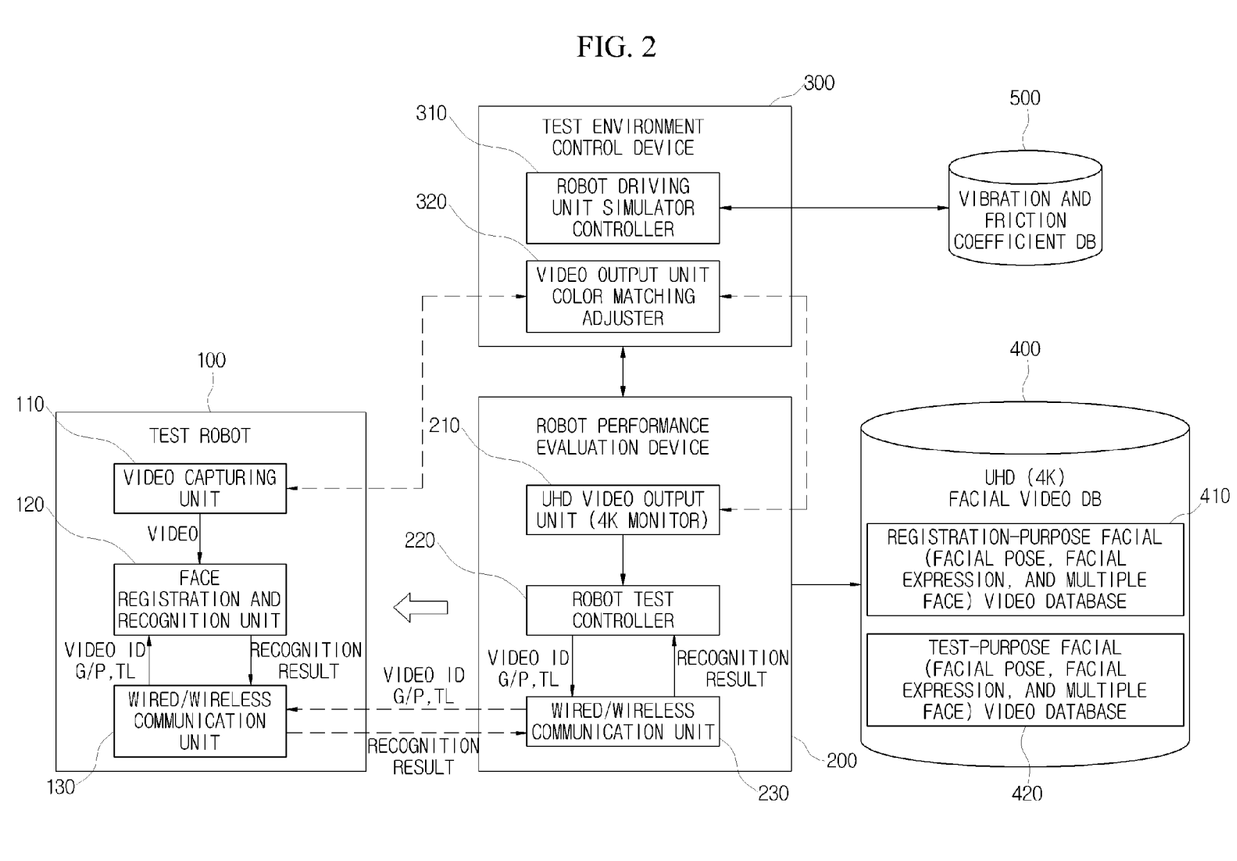
FIG. 2 is a block diagram showing an internal configuration of a system for evaluating the face recognition performance of a service robot using a UHD facial video database according to an exemplary embodiment of the present invention.

Referring to FIG. 2, the service robot 100 includes a video capturing unit 110, a face registration and recognition unit 120, and a wired/wireless communication unit 130.

Figure 3:
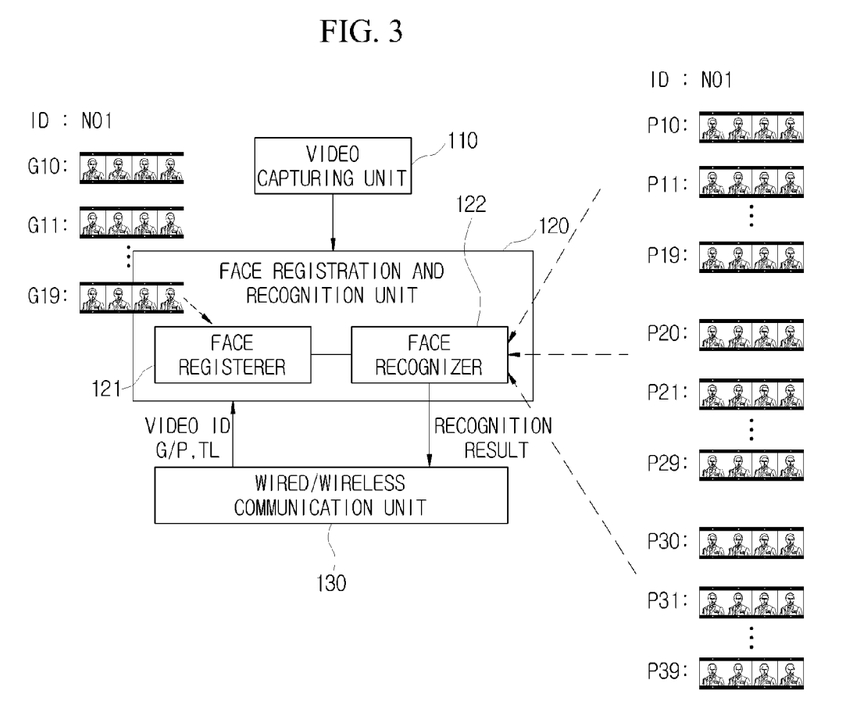
FIG. 3 is a block diagram showing an internal configuration of a face registration and recognition unit of FIG. 2.

The video capturing unit 110 captures a registration-purpose or test-purpose facial video displayed on the image output device, and delivers the captured facial video to the face registration and recognition unit 120. As shown in FIG. 3, the face registration and recognition unit 120 includes a face registerer 121 and a face recognizer 122, and selectively provides a face registration function and the face recognition function according to specifications of a facial video received through the wired/wireless communication unit 130. Here, the specifications include ID information, usage (gallery/probe) information, and test level information.

For example, it is assumed that the captured facial video delivered from the video capturing unit 110 is a registration-purpose facial video and specifications of the video are delivered through the wired/wireless communication unit 130. In this case, the face registerer 121 registers one frame or several frames of the video together with the specifications. For example, when N registration-purpose facial videos are delivered and ID information, usage information, and test level information on the videos is delivered, the face registerer 121 separately registers the N registration-purpose facial videos according to the N pieces of ID information.

As another example, the face registerer 121 can separately register the captured videos according to test levels as well as the ID information. For example, in the case of registering a facial video corresponding to Test level 2, one frame or some frames are registered from facial videos G10, G11, G12, . . . , and G19 obtained by capturing a motionless face 0' of a person for five seconds under 10 respective light sources.

When the facial video delivered from the video capturing unit 110 is a test-purpose video, that is, when usage information is a test state P in the specifications on the video received through the wired/wireless communication unit 130, the face recognizer 122 compares the captured test-purpose video with a registration-purpose video and outputs a face recognition result. Here, the recognition result can include registered ID information on the recognized test-purpose video.

As an example, when N registration-purpose facial videos are separately registered according to pieces of ID information and N×M test-purpose facial videos are delivered together with usage information thereon, the face recognizer 122 can compare the N×M test-purpose facial videos with the N registration-purpose videos and output recognition results. Here, the recognition results are transmitted to the robot performance evaluation device 200 through the wired/wireless communication unit 130.

As another example, the face recognizer 122 can perform face recognition according to the ID and the test level of the corresponding video. Assuming that a test for Test level 2 is performed, the registration-purpose facial videos G10, G11, G12, . . . , and G19 for evaluation of face recognition performance at Test level 2 should be registered in advance.

Meanwhile, the image output device of the robot performance evaluation device 200 displays 30 kinds of test-purpose facial videos P10, P11, . . . , and P19; P20, P21, . . . , and P29; and P30, P31, . . . , and P39 of a face in three poses, for example, in the cases of a face movement ranging from −10 degrees to 10 degrees, a face movement from −20 degrees to 20 degrees, and a face movement from −30 degrees to 30 degrees, captured for five seconds under 10 respective light sources. The video capturing unit 110 captures and transmits these videos to the face registration and recognition unit 120, and the face recognizer 122 performs face recognition by comparing these videos with registration-purpose facial videos.

Referring back to FIG. 2, the robot performance evaluation device 200 includes a UHD video output unit 210, a robot test controller 220, and a wired/wireless communication unit 230.

The UHD video output unit 210 controls the image output device to display an arbitrary facial video. For example, the image output device can output a registration-purpose facial video or a test-purpose facial video. Also, when a database is constructed from N registration-purpose facial videos, the image output device can output only one or some of the N registration-purpose facial videos.

On the other hand, when a database is constructed from N×M test-purpose facial videos, the UHD video output unit 210 can output only some of the N×M test-purpose facial videos or change an output sequence of the facial videos.

Figure 4:
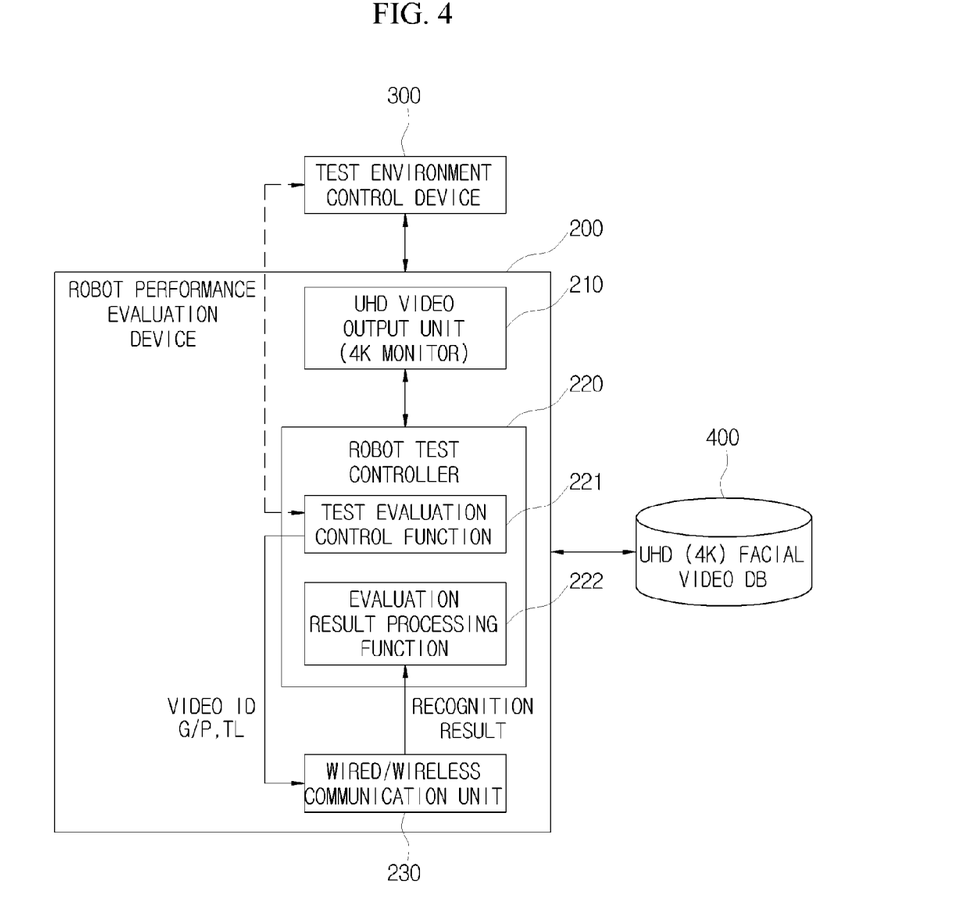
FIG. 4 is a block diagram showing an internal configuration of a robot performance evaluation device of FIG. 2.

FIG. 4 shows a detailed internal configuration of a robot test controller of FIG. 2.

Referring to FIG. 4, the robot test controller 220 performs a test evaluation control function 221 and an evaluation result processing function 222.

Specifically, the test evaluation control function 221 generally includes three functions. First, the robot test controller 220 controls a function of outputting a facial video on the image output device. Second, the robot test controller 220 determines a test level of a database to be used according to characteristics of a test-target robot, and controls a function of transmitting specifications of an output facial video. Third, the robot test controller 220 controls the test environment control device 300 to construct the same test environment as an actual operating environment of the service robot 100.

Figure 5:
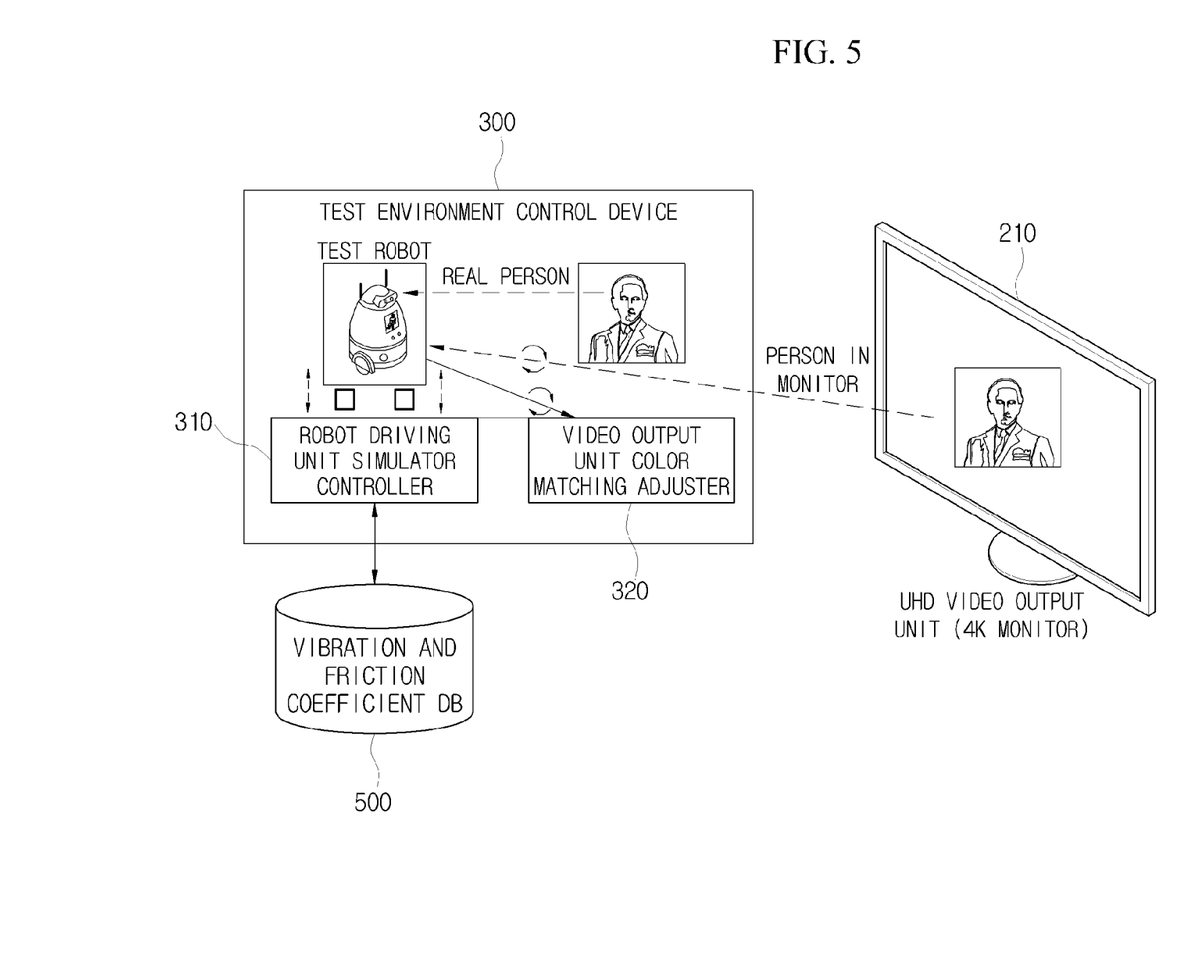
FIG. 5 is a block diagram showing an internal configuration of a test environment control device of FIG. 2.

Referring to FIG. 5, for example, the test environment control device 300 reproduces vibration occurring upon movement of a robot as in an actual operating environment, and adjusts a UHD facial video output on the image output device to have a condition the same as or similar to the face of a real person.

To this end, the test environment control device 300 includes a robot driving unit simulator controller 310 that reproduces a vibration and friction situation caused when a mobile robot moves, and a video output unit color matching adjuster 320 that controls the image output device so that a video captured by the robot can be the same as or similar to a video of a real subject.

When the mobile robot moves, vibration of the robot body varies according to the material of a floor surface, and the variance may affect image capturing and recognition. To reproduce a movement situation of a mobile robot, the robot driving unit simulator controller 310 refers to the vibration and friction coefficient database 500 and drives the robot. A friction coefficient is determined according to a usage of the robot, and the application surface environment of the service robot.

The vibration situation according to the friction coefficient is reproduced by the robot driving unit simulator controller 310.

Meanwhile, there may be difference between an image that a robot obtains by capturing an image output from an output device and an image that the robot obtains by capturing a real person. To correct a difference between two such images, the video output unit color matching adjuster 320 delivers an image correction signal to the UHD video output unit 210.

Specifically, the service robot 100 captures a facial video output from the image output device and transmits the captured facial video to the video output unit color matching adjuster 320. The video output unit color matching adjuster 320 has a previously stored video that the service robot 100 has obtained by capturing a real person of the facial video, and generates a correction signal for correcting the difference between the two videos using a color matching technique between the two videos. The correction signal is transmitted to the UHD video output unit 210 via the network, and the UHD video output unit 210 outputs a video corrected according to the correction signal.

Meanwhile, the evaluation result processing function 222 denotes a function of evaluating the performance of the face recognition function of the service robot 100 using a recognition result received from the service robot 100.

For example, the robot test controller 220 evaluates the performance of the face recognition function of the service robot 100 using a face recognition result received from the service robot 100.

Specifically, the face recognition result received from the service robot 100 can be ID information on a recognized test-purpose facial video. For example, as a performance evaluation result, the robot test controller 220 can output a performance index of a ratio of a number of pieces of ID information returned as a face recognition result from the service robot 100 to a number of pieces of ID information on registration-purpose UHD facial videos registered in the service robot 100.

A face recognition performance index is determined by a successful identification rate (SIR) shown in Equation 1 below.

$$SIR = \frac{No.\ of\ successful\ identification\ tests}{Total\ number\ of\ identification\ tests} \quad \text{[Equation 1]}$$

The wired/wireless communication unit 230 provides a communication interface capable of transmitting and receiving specifications of an output video and recognition result information between the service robot 100 and the robot performance evaluation device 200.

Thus far, a configuration of a system for evaluating the face recognition performance of a service robot using a UHD facial video database according to an exemplary embodiment of the present invention has been described. Operation of a system for evaluating the face recognition performance of a service robot using a UHD facial video database according to an exemplary embodiment of the present invention will be described below with reference to FIG. 6.

Figure 6:
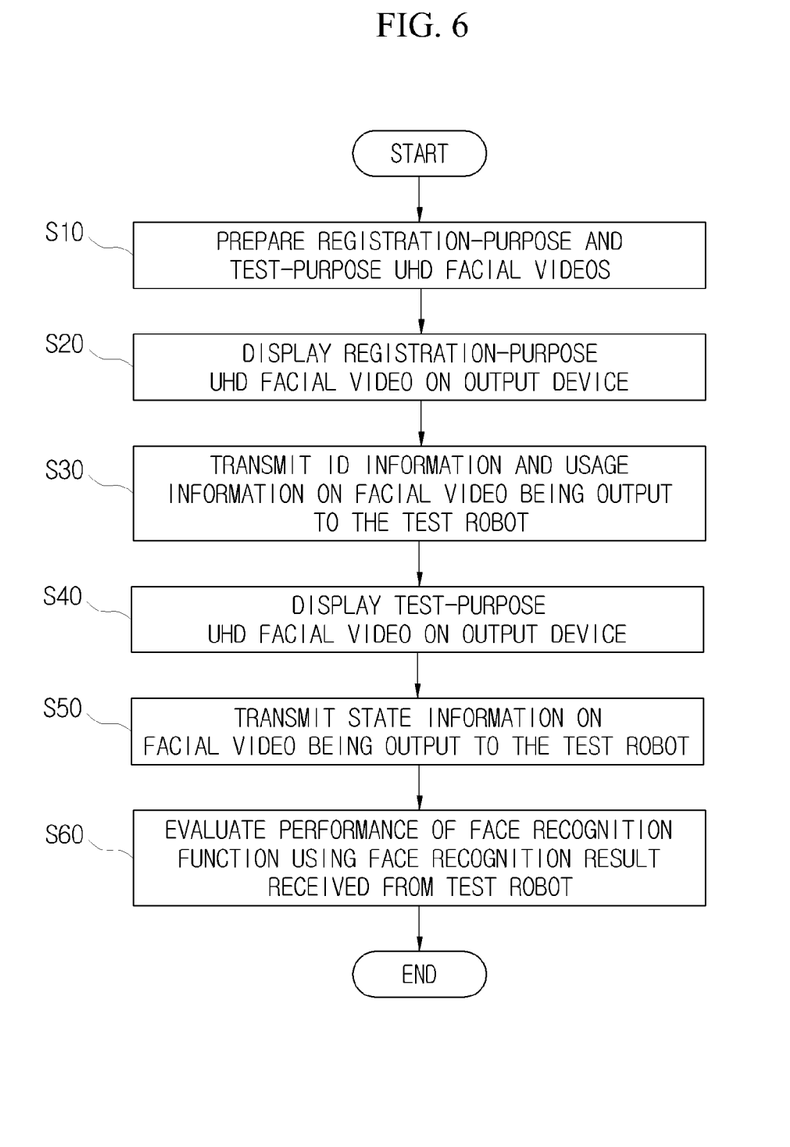
FIG. 6 is a flowchart illustrating a method of evaluating the face recognition performance of a service robot using a UHD facial video database according to an exemplary embodiment of the present invention.

FIG. 6 is a flowchart illustrating a method of evaluating the face recognition performance of a service robot using a UHD facial video database according to an exemplary embodiment of the present invention.

Referring to FIG. 6, in step 10, a registration-purpose or test-purpose UHD facial video is prepared. A registration-purpose video and a test-purpose video can be separately stored in the UHD facial video database 400. As an example, a video captured under a central light source in an environment having a plurality of light sources can be used as a registration-purpose video, and videos separately captured under respective light sources in an environment having the plurality of light sources can be classified and used as test-purpose videos. When recognition performance is evaluated with N persons, N registration-purpose videos are generated, and N×M test-purpose videos are separately generated under M respective light sources in an environment having the M light sources.

As another example, a registration-purpose or test-purpose UHD facial video database can be separately prepared according to test levels. Various combinations of a facial pose, a facial expression, a lighting environment, multiple faces, etc. can be made according to test levels. An exemplary embodiment of the combinations has been described above with reference to FIG. 7.

In step 20, the robot performance evaluation device 200 displays a registration-purpose UHD facial video on the output device. As an example, when a database is constructed from N registration-purpose facial videos, the robot performance evaluation device 200 can cause any one of the N registration-purpose facial videos to be output, or only some of the N registration-purpose facial videos to be output.

As another example, the robot performance evaluation device 200 determines a test level of a database to be used according to characteristics of a test-target robot, and displays a registration-purpose facial video of the determined test level on the output device. For example, when Test level 2 is determined, the robot performance evaluation device 200 outputs the facial videos G10, G11, G12, . . . , and G19 obtained by capturing the motionless face 0' of the person for five seconds under 10 respective light sources.

In step 30, the robot performance evaluation device 200 transmits specifications of the registration-purpose facial video currently displayed on the output device to the service robot 100. Here, the specifications include ID information, usage (gallery/probe) information, and test level information.

The ID information denotes information for identifying a registration-purpose facial video, and the usage information denotes information indicating whether the currently output video is a registration-purpose video or a test-purpose video.

At this time, the service robot 100 captures the registration-purpose facial video currently displayed on the output device, and performs a registration process using the captured facial video and at least one of the received ID information, usage information, and test level information.

In step 40, the robot performance evaluation device 200 displays a test-purpose UHD facial video on the output device. For example, when recognition performance is evaluated with N persons, the number of registration-purpose videos is N, and N×M test-purpose videos for the N registration-purpose videos are separately captured under M respective light sources in an environment having the M light sources.

As another example, the robot performance evaluation device 200 can display a test-purpose facial video of a specific test level on the output device according to the test-target robot. Face recognition can be performed according to the ID and the test level of the corresponding video. In the case of a test for Test level 2, the image output device displays the 30 kinds of test-purpose facial videos P10, P11, . . . , and P19; P20, P21, . . . , and P29; and P30, P31, . . . , and P39 of the face in three poses captured for five seconds under 10 respective light sources while the face moves, for example, in a range from −10 degrees to 10 degrees, a range from −20 degrees to 20 degrees, and a range from −30 degrees to 30 degrees.

In step 50, the robot performance evaluation device 200 transmits specifications of the test-purpose facial video currently displayed on the output device to the service robot 100. Here, the specifications include ID information, usage (gallery/probe) information, and test level information.

At this time, the service robot 100 captures the test-purpose facial video displayed on the output device, and outputs a recognition result by comparing the captured test-purpose video with registration-purpose videos. Here, the recognition result may include registered ID information on the recognized test-purpose video.

For example, when N registration-purpose facial videos have been separately registered according to pieces of ID information and N×M test-purpose facial videos are delivered together with usage information thereon, the service robot 100 can output recognition results by comparing the N×M test-purpose videos with the N registration-purpose videos. Here, the recognition results are transmitted to the robot performance evaluation device 200.

As another example, the service robot 100 can perform face recognition according to the ID and the test level of the corresponding video as described above.

In step 60, the robot performance evaluation device 200 evaluates the performance of the face recognition function of the service robot 100 using the received recognition result. For example as a performance evaluation result, the robot performance evaluation device 200 can output a performance index of a ratio of a number of pieces of ID information returned as a face recognition result from the service robot 100 to a number of pieces of ID information on registration-purpose UHD facial videos registered in the service robot 100.

Meanwhile, although not shown in FIG. 6, the robot performance evaluation device 200 can further perform a step of reproducing vibration occurring with movement of the service robot 100 as in an actual operating environment using the test environment control device 300, and adjusting a UHD facial video output on the image output device to have a condition the same as or similar to the face of a real person.

According to the above-described exemplary embodiments of the present invention, a UHD facial video is used to evaluate the face recognition performance of a service robot, and thus it is possible to provide a performance evaluation environment similar to an actual situation.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A system for evaluating face recognition performance of a service robot using an ultra high definition (UHD) facial video database, the system comprising a processor, the processor including:

a video output unit configured to output a registration-purpose or test-purpose UHD facial video;

a robot test controller configured to control transmitting identification (ID) information on a video currently being output to a service robot having a face recognition function when the video currently being output is a registration-purpose video, and performing evaluation of the face recognition function of the service robot using a recognition result received from the service robot when the video currently being output is a test-purpose video, wherein the robot test controller is also configured to create a test environment that is substantially similar to a test environment of the service robot;

a test environment control device configured to include simulating a vibration situation corresponding to a coefficient of friction determined according to an application surface environment of the service robot; and a wired/wireless communication unit configured to transmit the ID information and usage information indicating whether the video currently being output is a registration-purpose video or a test-purpose video to the service robot.

2. The system of claim 1, wherein the robot test controller configured to control outputting N registration-purpose videos on the video output unit and transmitting N pieces of ID information on the N registration-purpose videos and the usage information on the N registration-purpose videos to the service robot, and when the usage information indicates registration-purpose videos, the service robot separately registers the N registration-purpose videos according to the N pieces of ID information.

3. The system of claim 1, wherein the UHD facial video database comprising the registration-purpose video and the test-purpose video, wherein the registration-purpose video is a facial video captured under one light source in an environment having a plurality of light sources, and the test-purpose video is a plurality of facial videos separately captured under respective light sources in an environment having the plurality of light sources.

4. The system of claim 1, wherein the robot test controller configured to control outputting N×M test videos separately captured under M respective light sources in an environment having the M light sources on the video output unit for N respective registration-purpose videos, and transmitting the usage information on the N×M test-purpose videos to the service robot, and when the usage information indicates test-purpose videos, the service robot compares the N×M test-purpose videos with the N registration-purpose videos and outputs recognition results.

5. A method of evaluating face recognition performance of a service robot using an ultra high definition (UHD) facial video database, the method comprising:

preparing registration-purpose and test-purpose UHD facial videos;

displaying the registration-purpose UHD facial video on an output device;

transmitting identification (ID) information on the registration-purpose UHD facial video and first usage information indicating whether the video currently being output is a registration-purpose video or a test-purpose video to the service robot;

displaying the test-purpose UHD facial video on the output device;

transmitting second usage information indicating whether the video currently being output is a registration-purpose video or a test-purpose video to the service robot; and receiving a face recognition result determined by the service robot for the test-purpose UHD facial video displayed on the output device, and evaluating performance of a face recognition function of the service robot using the received face recognition result, wherein a test environment that is substantially similar to a test environment of the service robot is created; and simulating the test environment according to usage of the service robot, wherein the simulating of the test environment includes simulating a vibration situation corresponding to a coefficient of friction determined according to an application surface environment of the service robot.

6. The method of claim 5, wherein the preparing of the registration-purpose and test-purpose UHD facial videos includes constructing a database of the registration-purpose UHD facial video and the test-purpose UHD facial video, wherein the registration-purpose UHD facial video is a facial video captured under one light source in an environment having a plurality of light sources, and the test-purpose UHD facial video is a plurality of facial videos separately captured under respective light sources in an environment having the plurality of light sources.

7. The method of claim 5, wherein the displaying of the test-purpose UHD facial video on the output device includes displaying N×M test videos separately captured under M respective light sources in an environment having the M light sources on the video output unit for N registration-purpose videos.

8. The method of claim 5, wherein the evaluating of the performance includes outputting a performance index of a ratio of a number of pieces of ID information returned as the face recognition result from the service robot to a number of pieces of the ID information on the registration-purpose UHD facial video registered in the service robot.

9. A method of evaluating face recognition performance of a service robot using an ultra high definition (UHD) facial video database, the method comprising:

preparing registration-purpose and test-purpose UHD facial videos;

displaying a registration-purpose UHD facial video corresponding to a test level determined according to a type of the test-target service robot on an output device;

transmitting specifications of the registration-purpose UHD facial video including identification (ID) information, usage (gallery/probe) information, and test level information on the registration-purpose UHD facial video to the service robot;

displaying a test-purpose UHD facial video corresponding to the test level on the output device;

transmitting specifications of the registration-purpose UHD facial video including ID information, usage (gallery/probe) information, and test level information on the test-purpose UHD facial video to the service robot; and receiving a face recognition result determined by the service robot for the test-purpose UHD facial video, and evaluating performance of a face recognition function of the service robot using the received face recognition result, wherein a test environment substantially similar to a test environment of the service robot is created; and simulating the test environment according to usage of the service robot, wherein the simulating of the test environment includes simulating a vibration situation corresponding to a coefficient of friction determined according to an application surface environment of the service robot.

10. The method of claim 9, wherein the preparing of the registration-purpose and test-purpose UHD facial video includes constructing a database of the registration-purpose UHD facial videos and the test-purpose UHD facial videos, wherein the registration-purpose UHD facial videos and the test-purpose UHD facial videos are captured by changing a combination of a facial pose, a facial expression, a lighting environment, and multiple face according to test levels.

11. The method of claim 9, wherein the test-purpose UHD facial videos are captured by adding at least one of a facial pose, a facial expression, a lighting environment, and multiple face in comparison with the registration-purpose UHD facial videos.

12. The method of claim 9, wherein the evaluating of the performance includes outputting a performance index of a ratio of a number of pieces of ID information returned as the face recognition result from the service robot to a number of pieces of the ID information on the registration-purpose UHD facial videos registered in the service robot.

13. The method of claim 9, wherein the simulating of the test environment includes outputting at least one of the registration-purpose and test-purpose UHD facial videos corrected by using a color matching technique between a video that the service robot obtains by capturing the at least one of the registration-purpose and test-purpose UHD facial videos and a video that the service robot obtains by capturing a real person of the registration-purpose and test-purpose UHD facial videos.

* * * * *